United States Patent [19]

McClinton et al.

[11] Patent Number: 4,533,568
[45] Date of Patent: Aug. 6, 1985

[54] METHOD OF PREPARING A PATTERNED MOLD SURFACE

[75] Inventors: John L. McClinton, Hanover; Alexander H. Russell, Owings Mills, both of Md.

[73] Assignee: The Burns & Russell Company, Baltimore, Md.

[21] Appl. No.: 526,143

[22] Filed: Aug. 24, 1983

[51] Int. Cl.³ .............................................. B29C 1/04
[52] U.S. Cl. .................................. 427/135; 427/272; 427/292
[58] Field of Search ............... 427/135, 133, 272, 292; 249/135, 140; 204/26, 29, 30

[56] References Cited

U.S. PATENT DOCUMENTS

| 285,058 | 9/1883 | Nickerson | 249/135 |
| 4,404,232 | 9/1983 | Evertz | 427/135 X |

FOREIGN PATENT DOCUMENTS

| 1016319 | 8/1977 | Canada | 427/135 |
| 51-2946 | 1/1976 | Japan | 427/135 |
| 58-96894 | 6/1983 | Japan | 427/272 |
| 497525 | of 1939 | United Kingdom | 427/272 |

OTHER PUBLICATIONS

*Webster's Seventh New Collegiate Dictionary*, G. & C. Merriam Company, Springfield, Mass., 1967, p. 648.

Primary Examiner—Evan K. Lawrence
Attorney, Agent, or Firm—Cushman, Darby & Cushman

[57] ABSTRACT

A method of preparing a mold surface for forming a pattern on a molded article includes masking the mold surface, sandblasting the exposed surface of the mold, cleaning the mold surface and then depositing a metal layer on the mold surface to provide a metal coated mold surface having areas of altered surface texture corresponding to the pattern. The mold is then used to bond a resin coating to a masonry unit to provide a decorative surface pattern to the exterior molded surface of the resulting composite masonry unit.

10 Claims, 4 Drawing Figures

U.S. Patent  Aug. 6, 1985  4,533,568
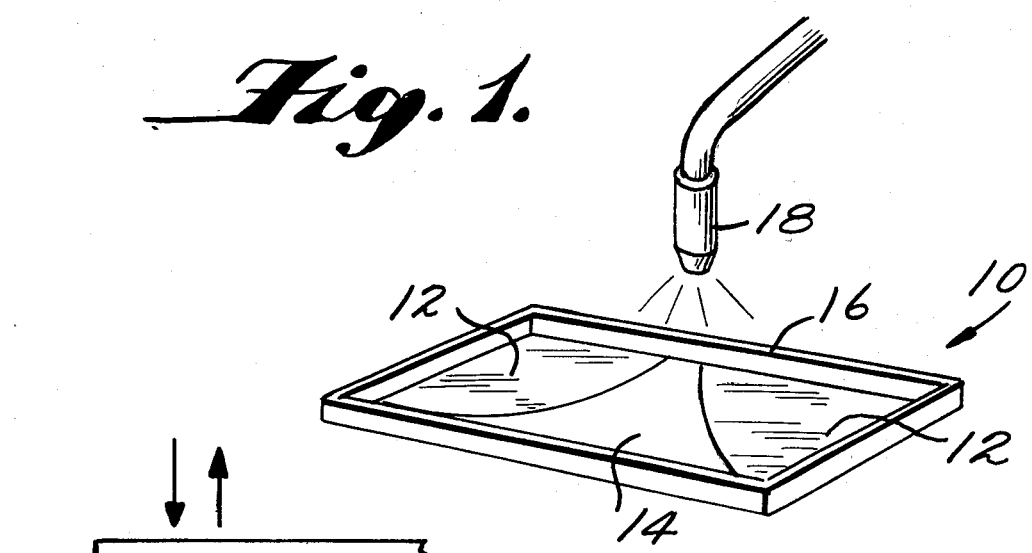
*Fig. 1.*
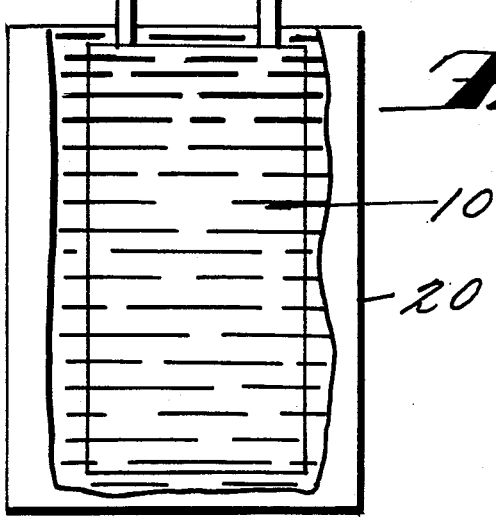
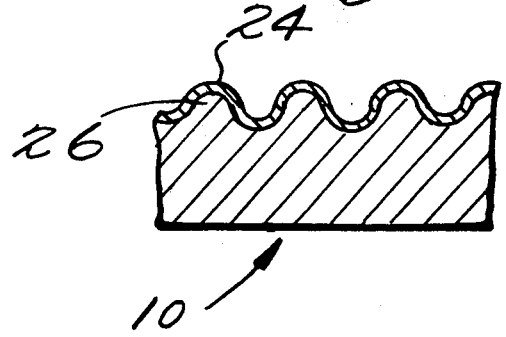
*Fig. 2.*  *Fig. 4.*
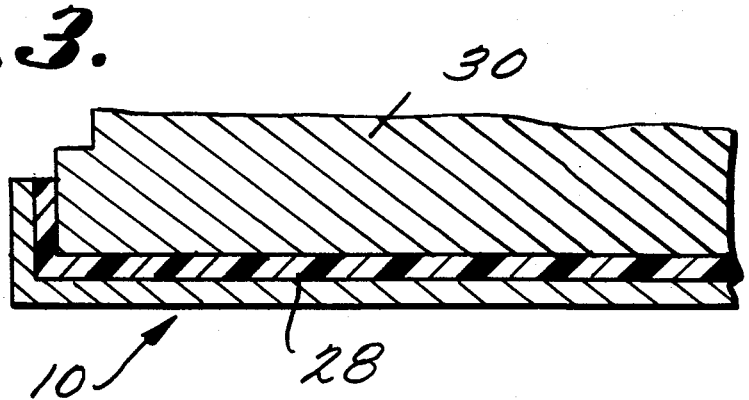
*Fig. 3.*

METHOD OF PREPARING A PATTERNED MOLD SURFACE

BACKGROUND AND SUMMARY OF THE INVENTION

The present invention relates to a method of texturing a mold surface to provide a desired pattern on a molded article.

In the past, molded plastic articles have been provided with a variety of surface textures by treating the mold in which the articles are formed. In addition, in the manufacture of molded articles, texturing of the surface of a resulting product has often been accomplished by treating the surface of the article after it has been molded such as by chemical etching, mechanical deformation or the like. While the foregoing procedures have been useful for a number of types of molded articles, where the molded article is employed in a building construction as a wall surface, conventional texturing techniques have been difficult to employ particularly where pigments have been included in the mold composition and where the mold composition includes a substantial quantity of a polymerizable resin such as polyester or an epoxy resin. In the mass production of discrete articles wherein each article is provided with a molded surface, it is impractical as a manufacturing expedient to individually treat an article once it has been molded as this appreciably affects the manufacturing cost. In addition, individual handling of articles after they have been molded can all too easily result in non-uniformities in the product as a consequence of the processing steps required subsequent to curing of the article in the mold.

Accordingly, it is an object of the present invention to provide a method of preparing a mold surface so that, in the course of molding an article, the mold will form a pattern on the molded article surface at the same time the article is being formed and cured in the mold.

In summary, the present invention utilizes a mild steel mold element which is first masked to cover a selected surface so that the mold's surface will impress a desired pattern on the molded article. The mold's surface, with the masking material affixed thereto, is then textured as by sandblasting on the uncovered mold surface areas. The mask is then removed and the mold cleaned preparatory to plating the entire mold surface with a metal such as nickel. The plated mold surface is then employed to form a molded article with a plastic resin material such as a polyester resin composition or an epoxy resin composition which may, if desired, incorporate a pigment and a filler such as sand. In a preferred embodiment, the plastic material in flowable form is deposited in the mold and a support member such as, for example, a masonry unit, bracket, wire mesh or the like is placed on the plastic composition so that when the plastic composition is cured in an oven, the composition will harden and be bonded to the surface of the support member. The portion of the composition facing the mold surface will then take on the texture as defined by the masking material so that in the finished article, the exterior surface thereof will take on the desired pattern.

With the method of the present invention, it has been found that the resulting product gives a unique appearance to the molded surface. In particular, the pattern has been observed to vary as an observer moves past the surface and as the angle of incidence of lighting to which the surface is exposed is varied.

The foregoing and other advantages will become apparent as consideration is given to the following description taken in conjunction with the accompanying drawings, in which:

BRIEF DESCRIPTION OF THE DRAWINGS

FIG. 1 is a schematic view of the method of the present invention;

FIG. 2 is a view in elevation with parts broken away illustrating another step of the present invention;

FIG. 3 is a sectional view in elevation of the mold in use

FIG. 4 is a side view in elevation in greatly enlarged detail of the mold surface after plating.

DETAILED DESCRIPTION OF THE INVENTION

The present invention is particularly useful in the field of coating masonry building units with unsaturated polyester resins such as disclosed in U.S. Pat. Nos. 2,751,775, 3,328,231, 3,632,725, 4,031,289, and 4,329,822, the entire disclosures of which are hereby incorporated by reference and relied upon. As described in the first four of the aforementioned U.S. patents, relatively inexpensive masonry units can be provided with a coating surface to produce a decorative, serviceable surface thereon which does not require any finishing after a wall is erected with the blocks. U.S. Pat. No. 4,329,822 describes types of support members that may also be provided with finished surfaces.

In order to enhance the decorative appearance of the coatings for such blocks or other materials, the present invention, as illustrated in FIG. 1, modifies the mold surface of a mold member 10 by providing masking material 12 over selected portions of the surface area of the mold 10. Other portions such as at 14 of the mold surface remain uncovered. The mold 10 has the usual side flanges 16 surrounding the facing surface of the mold. With the masking material 12 in the desired positions on the mold surface of the mold 10, the uncovered area 14 then has its texture altered by directing a media such as sand forcefully thereagainst by means of, for example, a nozzle 18. While sandblasting is the preferred instrument for altering the texture of the unmasked surface area of the mold 10, it will be apparent to those skilled in this art that other texture altering techniques may be employed.

Turning now to FIG. 2, according to the present invention, the masking material 12 is removed from the mold surface and then the mold is then thoroughly cleaned. Thereafter, the mold 10 is subjected to a plating step in tank 20 (shown with the tank wall partially broken away) where a suitable metal is deposited on the surface of the mold including the sandblasted portion 14. While conventional electrolytic deposition plating may be employed, it has been found that the use of electroless plating is preferred so as to minimize the possibility of incorporating any impurities in the metal deposited on the mold which can later affect the resin coating to be molded in the mold 10.

A preferred metal for depositing on the mold surface is nickel which can be deposited with a hypophosphite solution. A number of commercial baths are available and are described in "Metal Finishing Guidebook and Directory", Metals and Plastics Publications, Inc., Hackensack, N.J. (updated yearly), the disclosure of which is incorporated herein by reference and relied upon. The process and character of the electroless platings are discussed in *Kirk-Othmer Encyclopedia of Chemical Technology, Third Edition, Volume 8*, pages 738–750, John Wiley & Sons (1979), the disclosure of which is incorporated herein by reference and relied upon together with each and every reference cited therein.

After the mold 10 has been plated with the metal such as nickel, the mold 10 is then ready for forming a molded article.

With reference to FIG. 3, a molding composition, which may include a resin, pigment, filler and plasticizer as described in the aforementioned patents, may be milled into flowable form such as a slurry and then deposited in the mold 10 and spread over the appropriate interior surfaces of the mold 10 (the surfaces of altered texture are not shown). In one preferred embodiment, the masonry block 30 is inserted into the mold, and the weight of the block 30 will distribute the composition 28 to a substantially uniform extent over the subjacent surfaces of the mold 10. In many applications, it may be desirable to constitute the molding composition so that it is substantially in liquid form to facilitate even distribution over the mold surface. With the face of the block 30 inserted as illustrated in FIG. 3 into the mold 10, the mold 10 and block 30 with the coating composition 28 therebetween are then subjected to heat to cure the molding composition 28. In this regard, the mold 10 is preferably of mild steel, that is, a steel that has a maximum carbon content no greater than 0.25% as mild steel has superior heat conductivity as compared to stainless steel. Thus, with the mold 10 made of mild steel and plated with nickel as discussed above, a superior finish can be obtained on the cured resin 28 together with a faithful replication of the pattern resulting from the texturing of the bottom surface of the mold 10. The mold can be made substantially of hot rolled steel or cold rolled steel or of aluminum.

With reference now to FIG. 4, there is illustrated in enlarged sectional detail a schematic representation of the effect of texturing with the flow of an abrasive or surface altering media and plating with the solution in the tank 20 to provide the metal coating 24 on the textured surface 26 of the mold 10. It has been observed in viewing the molded surface of the composition 28 that at different angles of observation, the pattern obtained appears differently to an observer as the observer approaches and passes the molded article. This is believed due to the fact that the texturing of the metal while leaving a roughened surface as schematically illustrated in FIG. 4, has the texture evened out somewhat by the subsequent metal plating step. Thus, it has been observed that when one looked straight on at the pattern on the molded surface, the portion corresponding to the roughened area 14 of the mold 10 tends to blend into the other areas that have not been textured but that as the observer moves past and views the surface of the mold composition 28 at an angle, the pattern becomes strikingly evident. This effect has been noted to vary where the surface is on ground level and an observer moves 360 degrees about the surface creating exciting patterns and unusual color effects. This novel effect has a very pleasing decorative appearance and the effect is particularly pronounced when the molding composition includes a colored pigment.

Having described the invention, it will be apparent to those skilled in this art that various modifications may be made thereto without departing from the spirit and scope of this invention as defined in the appended claims.

What is claimed is:

1. A method of preparing the surface of a mold for forming a pattern on a molded article comprising the steps of:

applying masking material to the mold surface to cover a selected surface area thereof, directing a surface altering media against said mold surface to alter the surface texture of the uncovered area of the mold surface, said uncovered area corresponding to said pattern to form a coated mold surface having areas of altered surface texture corresponding to said pattern, removing the masking material from the mold surface, and, then, coating the mold surface with a metal including the previously masked as well as the unmasked areas.

2. The method as claimed in claim 1 wherein the step of directing a surface altering media against the mold surface comprises the step of sandblasting the mold surface.

3. The method as claimed in claim 1 wherein the step of coating the mold surface includes cleaning the mold surface and the subsequent step of electroless deposition of the metal on the mold surface.

4. The method as claimed in claim 3 including the step of using nickel as the deposition metal.

5. The method as claimed in claim 1 including the step of using a mold made of metal.

6. The method as claimed in claim 1 including the step of using a mold made substantially of mild steel.

7. The method as claimed in claim 1 including the step of using a mold made substantially of hot rolled steel.

8. The method as claimed in claim 1 including the step of using a mold made substantially of cold rolled steel.

9. The method as claimed in claim 1 including the step of using a mold made substantially of aluminum.

10. A method of preparing the surface of a mild steel mold for forming a pattern on an article to be molded in said mold, comprising the steps of:

applying masking material to the mold surface to cover a selected surface area thereof, sandblasting the mold surface to alter the surface texture of the uncovered area of the mold surface said uncovered area corresponding to said pattern, removing the masking material from said selected surface area and after cleaning the mold surface, depositing nickel on the mold surface including the previously masked as well as the unmasked areas to form a nickel coated mold surface having areas of altered surface texture corresponding to said pattern.

* * * * *